United States Patent Office 2,873,562
Patented Feb. 17, 1959

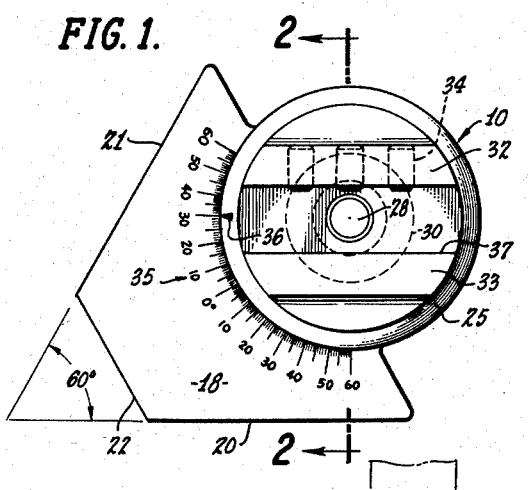
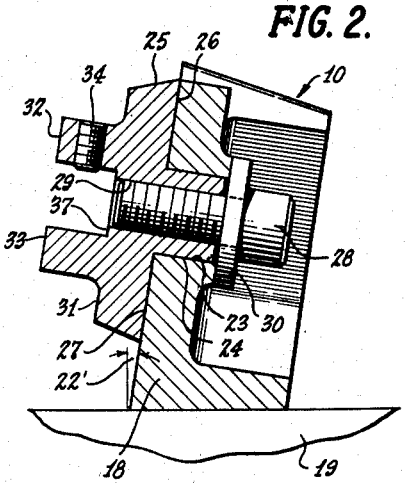
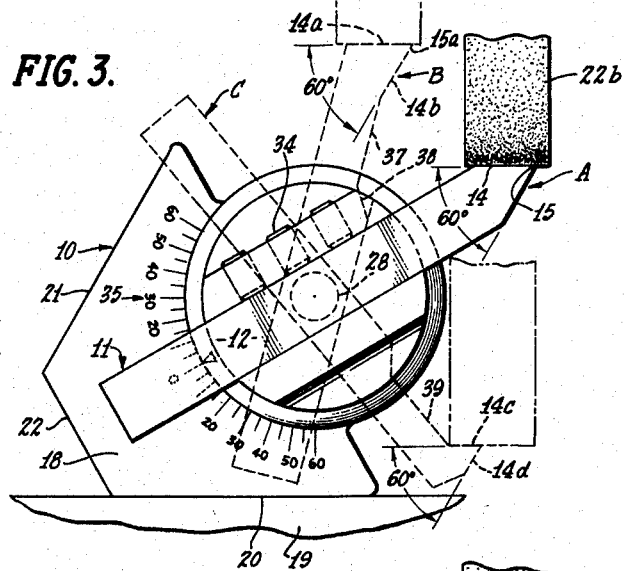
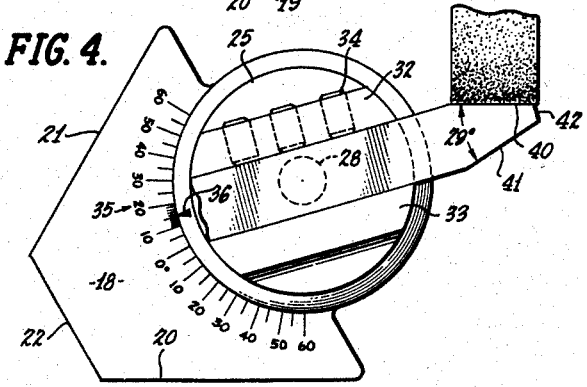
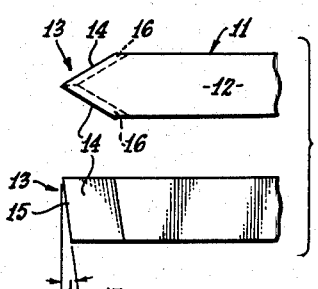
INVENTORS:
Nicholas S. Stanford &
Edward N. Bosco.

2,873,562

FIXTURE FOR HOLDING A TOOL SUBJECT TO GRINDING

Nicholas S. Stanford, North Hollywood, and Edward N. Bosco, Granada Hills, Calif.

Application August 2, 1956, Serial No. 601,677

9 Claims. (Cl. 51—220)

The present invention relates to a novel jig or fixture for holding thread-cutting tools, and an object of the present invention is to provide a simple fixture for holding a thread-cutting tool so that it will be presented to the grinding wheel to be accurately ground to the correct angle.

At the present time, it is the normal custom of the trade to hold the thread-cutting tool by hand and to shape it by manually holding it against the grinding wheel. This method, however, subjects the tool to considerable vibration, and this vibration necessarily causes the cutting edge of the tool to chip. This in turn causes considerable waste in time, effort, and material.

Where jigs or fixtures have been used, it has been necessary to employ at least two fixtures for properly shaping or sharpening the cutting edge of the tool for cutting angled threads, and if the tool were being shaped for cutting Acme threads, shims have had to be employed in order to obtain the properly angled sides. Even where fixtures of this type have been employed for shaping tools for cutting external threads, these same fixtures have not been adaptable for shaping a tool for cutting internal threads.

The fixture of the present invention is highly effective for holding a tool in predetermined relation with respect to a grinder, so that it can be shaped for cutting either external or internal threads or Acme threads. This improved fixture employs a novel base or body which carries a turnable member or tool holder, which can be locked in any predetermined angled relation with respect to the body. The sides of the body are in such angled relationship that a tool can be shaped for cutting either internal or external standard V threads without re-adjustment of the tool holder once the initial adjustment has been made. The tool holder, as previously suggested, is turnable relative to the body so that a cutting tool can be shaped for cutting accurate Acme threads with only a minimum amount of adjustment.

It is, therefore, another object of the present invention to provide a fixture for holding a cutting tool at predetermined angled relationship with respect to a grinder whereby the tool can be accurately and easily shaped for cutting Acme threads or standard internal or external threads.

Another object of the present invention is to provide a fixture employing a body element having a pair of sides in predetermined angled relationship, and a tool holder turnably supported in the body element and lockable in predetermined angled position with respect thereto.

It is yet another object of the present invention to provide a fixture having a body element having sides in 60° tapered angled relationship and a tool holder turnably supported in the body element and lockable in predetermined angled positions with respect thereto whereby a cutting tool carried by said tool holder can be shaped for cutting Acme threads or internal or external standard V threads. It is yet a further object of the present invention to provide a fixture wherein a cutting tool can be held at such an angle relative to the cutting surface of the grinder that it can be shaped for cutting internal standard V threads.

A still further object of the present invention is to provide a tool of this type which is relatively simple in operation and which can be constructed easily and economically.

Other objects and advantages of the present invention will be readily apparent to those skilled in the art upon perusal of the following description and drawings, wherein:

Fig. 1 is a side elevational view of a fixture embodying the principles of the present invention.

Fig. 2 is a vertical sectional view taken on the line 2—2 of Fig. 1.

Fig. 3 is a view similar to Fig. 1 showing a cutting tool in various illustrative positions according to the particular forms and dispositions of tool cutting end formations desired to be produced.

Fig. 4 is a view similar to Fig. 3 showing a cutting tool set for being shaped for cutting Acme threads.

Fig. 5 is a top and side view of the cutting end of one of the cutting tools shown in Fig. 3.

Referring to the drawings in detail, the number 10 designates a jig or fixture embodying the principles of the present invention and the number 11 designates a thread cutting tool of any well known or conventional design.

The thread cutting tool 11 employs the usual shank portion 12 one end of which is shaped in the form of a cutting edge 13. The cutting edge 13 for a tool of this type for cutting external American standard threads, such as disclosed in Fig. 5 for example, employs angular side faces 14 which lead toward and intersect at an angular front edge 15, the side clearance of the side edges being designated as 16 and an end relief of the front edge being designated as 17.

The fixture 10 comprises in the present instance a body or base 18 which is formed of a single piece of metal having the properties of being attracted to and firmly held by a magnetic surface or table 19. The body consists of a pair of side surfaces 20 and 21, the planes of which if projected would intersect in the form of a 60° angle, and a front face 22, the surface of which is normal to a plane intersecting the angle formed by side surfaces 20 and 21. The side surfaces 20 and 21 are tapered in identical manner as indicated by angle 22 with respect to side surface 20 so that the side clearance 16 and end relief 17 is automatically formed when a cutting tool 11 is shaped by a grinder 22b in a manner which will be more fully described hereinafter. The front face 22 is also tapered in the manner similar to the taper of side surfaces 20 and 21 for forming the end relief when shaping a cutting tool for cutting Acme threads as will be more fully described hereinafter. It will be appreciated, therefore, that the body 18 can be held by the magnetic table 19 either on its surface 20, its surface 21 or its front face 22.

Rotatably mounted in an opening 23 formed in the body 18 is a hub 24 of a tool holder 25. An inner face 26 of the tool holder 25 is positioned in intimate relationship with respect to an outer face 27 of the body 18, and a screw 28 is threadedly received in an opening 29 formed in the tool holder. A suitable washer 30 is received by screw 28, and it will be appreciated that the tool holder 25 can be drawn against the outer face 27 of body 18 to an extent sufficient to lock the tool holder against relative movement with respect to the body. It will be also appreciated that when the screw is loosened the tool holder can be angularly adjusted relative to the body 18 to any predetermined position and then locked in this predetermined position by turning screw 28 sufficiently to draw the tool holder 25 tightly against the outer face 27 of the holder. The outer face 31 of the tool holder is provided with a pair of opposed jaws 32 and 33 which are so spaced in parallelism as to receive therein the shank 12 of the cutting tool. The jaw 32 threadedly receives a plurality of set screws 34, which when tightened, bear against the shank of the cutting tool to an extent sufficient to firmly lock the cutting tool between the jaws 32 and 33.

The front face of the body 18 has impressed thereon or associated therewith a scale 35 which is graduated from an indication marked zero degrees which is located in the plane intersecting the angle formed by sides 20 and 21 to a 60° indication to both sides of the zero degree indication and adjacent the periphery of the tool holder. A suitable indicator 36 is located on the outer face 31 of the tool holder and in alignment with the longitudinal aixs of the space 37 located between jaws 32 and 33 so that when the tool holder is locked against relative movement with respect to body 18 by screw 28 with the indicator 36 in alignment with the zero degree indication mark of scale 35, the cutting tool will be held relative to the table surface 19 when the body 18 is supported on the table by either its surface 20 or its surface 21 at a 30° angle.

To form the cutting edge disclosed in Fig. 5 wherein the front edge 15 is located in alignment with the longitudinal axis of the shank 12, the cutting tool is located in the position indicated by the letter A, see Fig. 3. In this position the tool holder is locked by screw 28 against relative movement with respect to the body 18 with the indicator 36 in alignment with the zero degree indicator of scale 35. When the body 18 is then held by the magnetic table on its face 20, one angular face 14 of the tool can be cut by the grinder 22b. When this one face has been shaped, the body 18 is turned over so that the face of surface 21 is supported on the magnetic table and the other angular face is then formed by the grinder 22b so that a straight 60° cutting edge is available which has sides tapering away from the front edge 15. As previously suggested the tapering of the surfaces 20 and 21 automatically compensates for the side clearance 16 of the side faces 14 and for the end relief 17 of the front edge 15. It will be appreciated that since the sides 20 and 21 form a 60° angle, and since the tool holder holds the cutting tool at a 30° angle relative to the magnetic table, that a straight 60° thread cutting edge can be formed by shaping one face 14 when the face 20 is on the magnetic table and the other face 14 when the face 21 is on the table without necessitating the removal of the tool from the holder for readjustment or resetting everytime a new face is cut or shaped.

In the event it is desired to move the front edge of the 60° angle cutting point to one side of the longitudinal axis of the tool such as is shown for the tool indicated in the position B in Fig. 3, the tool holder can be rotated by loosening screw 18 and locked in the position wherein the tool is held in a substantially upwardly extending position. In this position of the tool holder it will be appreciated that one face 14a is formed when the surface 20 is supported on the magnetic table and another surface 14b is formed when the body is turned over so that the surface 21 is supported on the magnetic table and since the surfaces 20 and 21 are located at a 60° angle with respect to one another, the cutting surfaces 14a and 14b will be also in the form of a 60° cutting point. The side faces 14a and 14b will also be formed with a side clearance in the same fashion as indicated at 16 with respect to Fig. 5 and the front edge 15a will also be provided with an end relief in the same manner as indicated at 17 in Fig. 5.

Thus it will be apparent that the cutting point in the present instance has been moved to one side of the tool to permit the tool to be placed in the holder of a lathe and to be moved up to the chuck without the tool interfering with the chuck. This is further accomplished by cutting the side material of the tool to the dotted lines indicated at 37 and 38. It will be appreciated, therefore, that any angular position of the 60° cutting edge can be selected for the tool by selecting the setting of the tool holder relative to the body 18. It will also be appreciated, however, that irrespective of the setting, a perfect 60° cutting edge will be formed without requiring any readjustment of the tool holder relative to the body or of the cutting tool relative to the tool holder inasmuch as the faces 20 and 21 are formed at a 60° angle relative to each other.

As previously suggested the fixture of the present invention has an additional advantage in that cutting tools can be shaped for cutting internal standard V threads. Referring once again to Fig. 3 it will be noted that if the tool holder is so adjusted relative to the body, the cutting tool can be located in the position indicated at C with the lower end thereof protruding beyond right edge of the tool holder to an extent sufficient to permit the grinder to be moved vertically against this portion of the cutting tool so that the inner face 14c can be formed when the face 20 of the body is resting on the magnetic table.

To shape the face 14d the body is turned over so that the face 21 is resting on the magnetic table and the grinder can then be moved so as to form this face. It will be appreciated that the faces 14c and 14d are similar in configuration to the faces 14 of the tool shown in Fig. 5. The tool adjacent the shaped cutting edge is ground away to the extent indicated by dotted line 39 so that the shank of the tool adjacent the cutting edge will not interfere with the stock being threaded.

To form Acme threads the cutting tool is so shaped that the cutting surfaces are positioned at a 29° angled relationship. To effect an angled cut of this type the tool holder is so adjusted relative to the scale 35 of the body that the indicator 36 is located in alignment with the 15½° indicator on the scale to the left of the zero indicator as viewed in Fig. 4. With the surface 20 of the body supported on the magnetic table, the grinder surface is positioned at a 14½° angle relative to the longitudinal axis of the cutting tool. When one angled side 40 is shaped at an angle of 14½° relative to the longitudinal axis of the tool, the tool holder is loosened and moved so that the indicator is moved into alignment with the 15½° indicator of the scale to the right of the zero indicator. The tool holder is then locked in this position and the body turned over so that the face 21 is supported on the magnetic table. The cutting end of the tool is then so positioned that another face 41 can be shaped which is likewise at 14½° angle relationship to the longitudinal axis for the tool so that the sides 40 and 41 are in 29° angled relationship. After the sides 40 and 41 have been formed, the tool holder is again loosened and adjusted so that the zero indicator is in alignment with the zero indicator on the scale and then locked in this position. The body is then placed so that the face 22 is supported on the magnetic table and the front surface 42 is ground to the width desired.

It will be appreciated that the 14½° cutting surfaces 40 and 41 can be moved around the end of the tool by selecting various 31° increments on the scale between which the grinding operations will take place and the center between this 31° spread will in turn determine the setting for machining the flat surface 42 when the front face 22 is supported on the magnetic table.

What is claimed is:

1. A fixture for supporting an elongated thread-cutting tool on a table in predetermined angled relationship with respect to a grinder comprising a unitary body having a pair of side surfaces converging in predetermined angled relationship, a tool holder carried by said body and rotatable about an axis substantially normal to a plane passing through corresponding side edges of said side surfaces and located in the plane bisecting the angle of said converging side surfaces, means for locking said tool holder in predetermined angled relationship with respect to said side surfaces, and means for rigidly fixing said tool with said tool holder in a position to extend transversely of said axis of said tool holder whereby a predetermined cutting edge can be formed on one end of said tool by shaping one face of said cutting edge when said tool is supported on said table on one of its side surfaces and the other face of said cutting tool can be formed when said body is turned over and supported on said table on its other side surface.

2. A fixture for supporting an elongated thread-cutting tool on a table in predetermined angled relationship with respect to a grinder comprising a unitary body having a pair of side surfaces converging in 60° angled relationship, a tool holder carried by said body and rotatable about an axis substantially normal to a plane passing through corresponding side edges of said side surfaces and located in the plane bisecting the angle of said converging side surfaces, means for locking said tool holder in predetermined angled relationship with respect to said side surfaces, and means for rigidly fixing said tool with said tool holder in a position to extend transversely of said axis of said tool holder whereby a predetermined cutting edge can be formed on one end of said tool by shaping one face of said cutting edge when said tool is supported on said table on one of its side surfaces and the other face of said cutting tool can be formed when said body is turned over and supported on said table on its other side surface.

3. A fixture for supporting a thread-cutting tool on a table having a work surface in predetermined angled relationship with respect to a grinder comprising a unitary body having an outer surface and a pair of tapered side surfaces converging in 60° angled relationship, the divergence of the tapered side surfaces defining the outer surface, a tool holder carried by said body and rotatable about an axis substantially normal to said outer surface and located in the plane bisecting the angle of said converging side surfaces, means for locking said tool holder in predetermined angled relationship with respect to said side surfaces, and means for rigidly fixing said tool with said tool holder whereby the longitudinal axis of said tool is substantially parallel with said outer surface and at an obtuse angle respective to the table surface whereby a predetermined cutting edge can be formed on one end of said tool by shaping one face of said cutting edge when said tool is supported on said table on one of its side surfaces and the other face of said cutting tool can be formed when said body is turned over and supported on said table on its other side surface.

4. A fixture for a thread-cutting tool adapted to be associated with a magnetic table having a work surface comprising a body having angularly disposed side surfaces and an interconnecting flat outer face defined by the divergence of the angularly disposed side surfaces, means for holding said cutting tool with said body in substantially parallel relation to said outer face and in predetermined angled positions with respect to said side surfaces and the surface of the table whereby the cutting edge of said tool can be shaped by forming one side thereof when one side surface of said body is supported on said table and the other side thereof when the other side of said body is supported on said table.

5. A fixture for a thread cutting tool adapted to be associated with a magnetic table comprising a body having 60° angularly disposed tapered side surfaces and an interconnecting flat, inclined outer face defined by the divergence of the tapered side surfaces, and a tool holder supported by said body for rotation about an axis substantially normal to said outer face and lying in the plane bisecting the angle formed by said sides, means for rigidly holding said tool with said tool holder adjacent to and in substantially parallel relationship with respect to said outer face and having said tool's cross section at an inclined angle relative to the table, said tool holder being lockable in predetermined angled relationship with respect to said side surfaces, said body and said tool holder having formed thereon a cooperating scale and indicator, whereby a 60° cutting edge for said tool can be shaped by forming one cutting face thereof when one side surface of said body is supported on said table and the other cutting face thereof when the other side of said body is supported on said table and whereby a cutting edge for cutting Acme threads can be formed by adjusting the tool holder 31° relative to the body after the first cutting face of the tool has been formed with said body being supported on one of its side surfaces and then forming the second cutting face after the body has been turned over and supported on its other side surface.

6. The invention defined in claim 5 wherein said body has an interconnecting tapered front face the surface of which is normal to the plane bisecting the angle formed by said side surfaces whereby the front edge of said tool for cutting Acme threads can be formed by supporting said body on said front face and adjusting said tool holder relative to said body to the center of said 31° increment.

7. A fixture for a thread-cutting tool adapted to be associated with the surface of a magnetic table comprising a body having 60° angularly disposed tapered side surfaces and an interconnecting flat outer face defined by the divergence of the tapered side surfaces, and a tool holder supported by said body for rotation about an axis substantially normal to said outer face, means for rigidly holding said tool with said tool holder adjacent to and in substantially parallel relationship with respect to said outer face and at an obtuse angle to the table surface, said tool holder being lockable in predetermined angled relationship with respect to said side surfaces whereby said cutting tool can be so angled relative to said table that the cutting edge of said tool can be shaped for cutting internal threads by forming one cutting face thereof when one side surface of said body is supported on said table and the other cutting face thereof when the other side surface of said body is supported on said table.

8. A fixture for a thread-cutting tool adapted to be associated with a magnetic table comprising a body having 60° angularly disposed tapered side surfaces and an interconnecting flat outer face, said body having an opening formed therein substantially normal to said outer face and the axis of which lies in the plane bisecting the angle formed by said side surfaces, a tool holder having a hub portion rotatably received in said opening, the outer face of said tool holder having formed thereon a pair of spaced jaws, a plurality of set screws received by one of said jaws and positioned so as to bear against a cutting tool for rigidly holding said cutting tool between said jaws adjacent to and in substantially parallel relationship with respect to said outer face of said body, and means for locking said tool holder in predetermined angled positions with respect to said body whereby the longitudinal axis of said cutting tool can be presented in predetermined angled relation to said side surfaces whereby said cutting tool can be shaped for cutting either internal or external threads by locking said tool holder in predetermined angled position with respect to said body and shaping one face of said cutting edge upon one side surface of said body being supported on said table and the other face of said cutting edge upon the other side surface of said body being supported on said table.

9. A fixture for a thread-cutting tool adapted to be associated with a magnetic table comprising a body having 60° angularly disposed tapered side surfaces, an interconnecting tapered front face substantially normal to the plane bisecting said angle formed by said side surfaces, and an interconnecting flat outer face, said body having an opening formed therein substantially normal to said outer face and the axis of which lies in the plane bisecting the angle formed by said side surfaces, a tool holder having a hub portion rotatably received in said opening, the outer face of said tool holder having formed thereon a pair of spaced jaws, a plurality of set screws received by one of said jaws and positioned so as to bear against a cutting tool for rigidly holding said cutting tool between said jaws and in substantially parallel relationship with respect to said outer face of said body, means for locking said tool holder in predetermined angled positions with respect to said body, said body and said tool holder having formed therein a cooperating scale and indicator whereby said cutting tool can be shaped for cutting Acme threads by locking said tool holder in any predetermined angled position with respect to said body and shaping one face of said cutting edge upon one side surface of said body being supported on said table and the other face of said cutting edge upon the other side surface of said body being supported on said table and said holder being angularly adjusted 31° relative to said body and the front cutting edge by supporting said body on its front face and adjusting said tool holder relative to said body to the center of said 31° increment.

References Cited in the file of this patent

UNITED STATES PATENTS

| | | |
|---|---|---|
| 1,908,155 | Jorgensen | May 9, 1933 |
| 2,735,245 | Grieco | Feb. 21, 1956 |